United States Patent
Rubio

(10) Patent No.: US 10,250,460 B2
(45) Date of Patent: Apr. 2, 2019

(54) MULTIFUNCTIONAL PLATFORM SYSTEM WITH DEVICE MANAGEMENT MECHANISM AND METHOD OF OPERATION THEREOF

(71) Applicant: HP PRINTING KOREA CO., LTD., Suwon-si, Gyeonggi-Do (KR)

(72) Inventor: Ramon Rubio, Rossmoor, CA (US)

(73) Assignee: HP PRINTING KOREA CO., LTD., Suwon-si (KR)

( * ) Notice: Subject to any disclaimer, the term of this patent is extended or adjusted under 35 U.S.C. 154(b) by 461 days.

(21) Appl. No.: 14/823,760

(22) Filed: Aug. 11, 2015

(65) Prior Publication Data

US 2016/0050126 A1  Feb. 18, 2016

Related U.S. Application Data

(60) Provisional application No. 62/036,528, filed on Aug. 12, 2014.

(51) Int. Cl.
*G06F 15/173* (2006.01)
*H04L 12/24* (2006.01)
(Continued)

(52) U.S. Cl.
CPC ........ *H04L 41/5054* (2013.01); *H04L 41/046* (2013.01); *H04L 41/0896* (2013.01);
(Continued)

(58) Field of Classification Search
CPC ............... H04L 41/5054; H04L 41/046; H04L 41/0896; H04L 41/5025
See application file for complete search history.

(56) References Cited

U.S. PATENT DOCUMENTS 7,069,558 B1\* 6/2006 Stone ...................... G06F 9/485
718/100
8,015,280 B2 9/2011 Saha et al.
(Continued)

FOREIGN PATENT DOCUMENTS

WO  20131006226 A1  1/2013

OTHER PUBLICATIONS

Enterprise Single Sign-On Plus Solution/ http://isites.harvard.edu/fs/docs/itb.topic910998.files/Team5capstoneV1.pdf Spring 2011.

*Primary Examiner* — Moustafa M Meky
*Assistant Examiner* — Kidest Mendaye
(74) *Attorney, Agent, or Firm* — Staas & Halsey LLP

(57) ABSTRACT

A platform management system includes: a control unit configured to implement a device smart agent to: receive a management request; calculate a projected resource usage for an agent host device based on execution of the management request; determine a performance degradation of a primary device function of the agent host device based on the projected resource usage; determine a request type of the management request based on the performance degradation; generate an inter-device communication based on the request type of the management request; and a communication unit, coupled to the control unit; configured to: transmit the inter-device communication from the device smart agent for receipt by a non-agent device or an agent enabled device.

20 Claims, 6 Drawing Sheets

(51) Int. Cl.
*H04N 1/00* (2006.01)
*H04N 1/44* (2006.01)

(52) U.S. Cl.
CPC ..... *H04L 41/5025* (2013.01); *H04N 1/00344* (2013.01); *H04N 1/00408* (2013.01); *H04N 1/4413* (2013.01); *H04N 1/4426* (2013.01); *H04N 1/4433* (2013.01); *H04N 2201/0094* (2013.01)

(56) References Cited

U.S. PATENT DOCUMENTS

| | | | |
|---|---|---|---|
| 8,725,770 B2 | 5/2014 | Koide et al. | |
| 2004/0153479 A1* | 8/2004 | Mikesell | G06F 11/1096 |
| 2009/0021773 A1* | 1/2009 | Rai | G06Q 10/06 |
| | | | 358/1.15 |
| 2010/0082748 A1* | 4/2010 | Banks | G06F 9/542 |
| | | | 709/206 |
| 2010/0082784 A1* | 4/2010 | Rosenblatt | H04L 12/2812 |
| | | | 709/222 |
| 2011/0276986 A1* | 11/2011 | Kamath | G06F 3/1203 |
| | | | 719/328 |
| 2011/0283121 A1* | 11/2011 | Kuroda | G06F 1/3203 |
| | | | 713/310 |
| 2012/0016721 A1* | 1/2012 | Weinman | G06Q 10/06 |
| | | | 705/7.35 |
| 2012/0030356 A1* | 2/2012 | Fletcher | G06F 9/5094 |
| | | | 709/226 |
| 2012/0081749 A1* | 4/2012 | Kitada | G06F 3/121 |
| | | | 358/1.15 |
| 2014/0075024 A1* | 3/2014 | Koza | H04L 63/104 |
| | | | 709/225 |

\* cited by examiner

MULTIFUNCTIONAL PLATFORM SYSTEM WITH DEVICE MANAGEMENT MECHANISM AND METHOD OF OPERATION THEREOF

CROSS-REFERENCE TO RELATED APPLICATION(S)

This application claims the benefit of U.S. Provisional Patent Application Ser. No. 62/036,528 filed Aug. 12, 2014, and the subject matter thereof is incorporated herein by reference thereto.

TECHNICAL FIELD

An embodiment of the present invention relates generally to a multifunctional platform system, and more particularly to a system for device management.

BACKGROUND

Modern consumer and industrial electronics, especially devices such as multifunctional peripheral devices, network devices, and electronic appliances are providing increasing levels of functionality to support modern life including cloud connectivity and solutions for these devices. Research and development in the existing technologies can take a myriad of different directions.

As more devices become cloud ready and more solutions are provided through cloud computing systems, these devices require additional means to communicate and information exchange with the cloud based systems. Furthermore, additional measures are needed to provide security for communication to cloud based solutions and computing systems.

Thus, a need still remains for a multifunctional platform system with device management mechanism for managing communication and information exchange with cloud based computing systems. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a system, including: a control unit configured to implement a device smart agent to: receive a management request; calculate a projected resource usage for an agent host device based on execution of the management request; determine a performance degradation of a primary device function of the agent host device based on the projected resource usage; determine a request type of the management request based on the performance degradation; generate an inter-device communication based on the request type of the management request; and a communication unit, coupled to the control unit; configured to: transmit the inter-device communication from the device smart agent for receipt by a non-agent device or an agent enabled device.

An embodiment of the present invention provides a method including: receiving a management request; calculating a projected resource usage for an agent host device based on execution of the management request; determining with a control unit a performance degradation of a primary device function of the agent host device based on the projected resource usage; determining a request type of the management request based on the performance degradation; generating an inter-device communication based on the request type of the management request; and transmitting the inter-device communication from a device smart agent for receipt by a non-agent device or an agent enabled device.

An embodiment of the present invention provides a non-transitory computer readable medium including instructions executable by a processor, the instructions comprising: receiving a management request; calculating a projected resource usage for an agent host device based on execution of the management request; determining a performance degradation of a primary device function of the agent host device based on the projected resource usage; determining a request type of the management request based on the performance degradation; generating an inter-device communication based on the request type of the management request; and transmitting the inter-device communication from a device smart agent for receipt by a non-agent device or an agent enabled device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
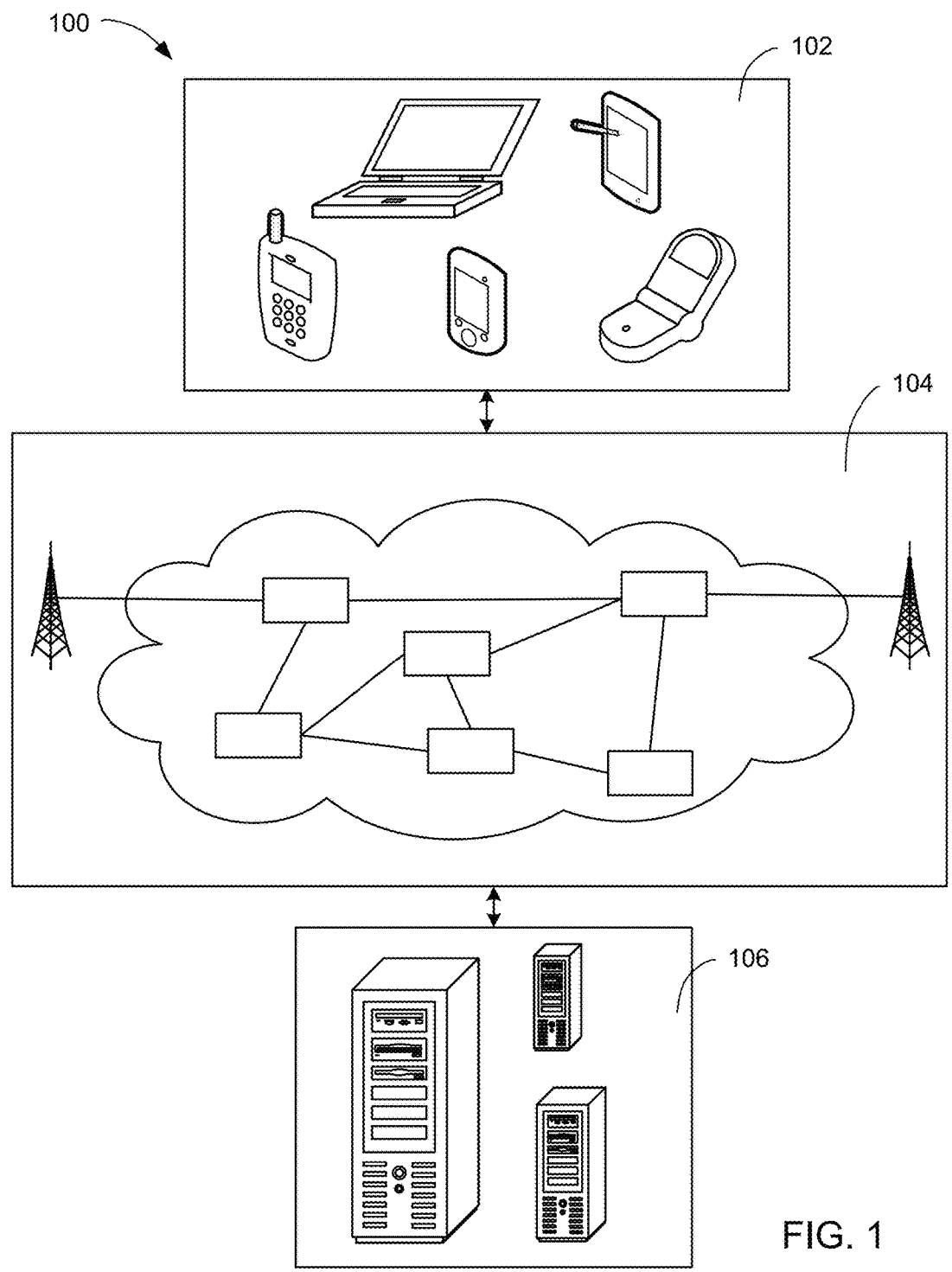
FIG. 1 is a multifunctional platform system with device management mechanism in an embodiment of the present invention.

An embodiment of the present invention provides the cooperative request that can enable scalability and optimize execution of the management request. The cooperative request can take advantage of the available system resources of each of the agent enabled device by dividing the management request into the cooperative request partitions, enables scalability of the scope of the management request and optimizes the use of the agent enabled devices.

Another embodiment of the present invention provides the agent communication channel that improves security and reduces redundancy. The agent communication channel provides a single security communication channel for all of the device plug-ins for the agent host device and eliminates the need for each of the device plug-ins have its own agent for communication through the network firewall, which improves security and reduces redundancy.

A further embodiment of the present invention provides the device smart agent that can improve remote management of devices on the closed network with the delegation request. The delegation request can be routed through and executed by the device smart agent. This enables the platform management unit to access or request information from devices that it would not have access to otherwise, such as the non-agent device, because the devices are not cloud enabled or due to the network firewall, which improves remote management of the devices on the closed network.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items. For example, coupling can include communication between modules, such as function calls or jumps, through shared memory or an application programming interface.

Referring now to FIG. 1, therein is shown a multifunctional platform system 100 with device management mechanism in an embodiment of the present invention. The multifunctional platform system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a multifunctional peripheral device, such as a multifunctional printer or copy machine, cellular phone, personal digital assistant, a notebook computer, an appliance, such as a television, projector, a smart television having networking capabilities, a refrigerator, or a microwave. The first device 102 can couple, either directly or indirectly, to the communication path 104 to communicate with the second device 106 or can be a stand-alone device.

The second device 106 can be any of a variety of centralized or decentralized computing devices. For example, the second device 106 can be a multimedia computer, a laptop computer, a desktop computer, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the multifunctional platform system 100 is described with the second device 106 as a computing device, although it is understood that the second device 106 can be different types of devices. Also for illustrative purposes, the multifunctional platform system 100 is shown with the second device 106 and the first device 102 as end points of the communication path 104, although it is understood that the multifunctional platform system 100 can have a different partition between the first device 102, the second device 106, and the communication path 104. For example, the first device 102, the second device 106, or a combination thereof can also function as part of the communication path 104. As a specific example, the first device 102 can be connected to other devices through the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
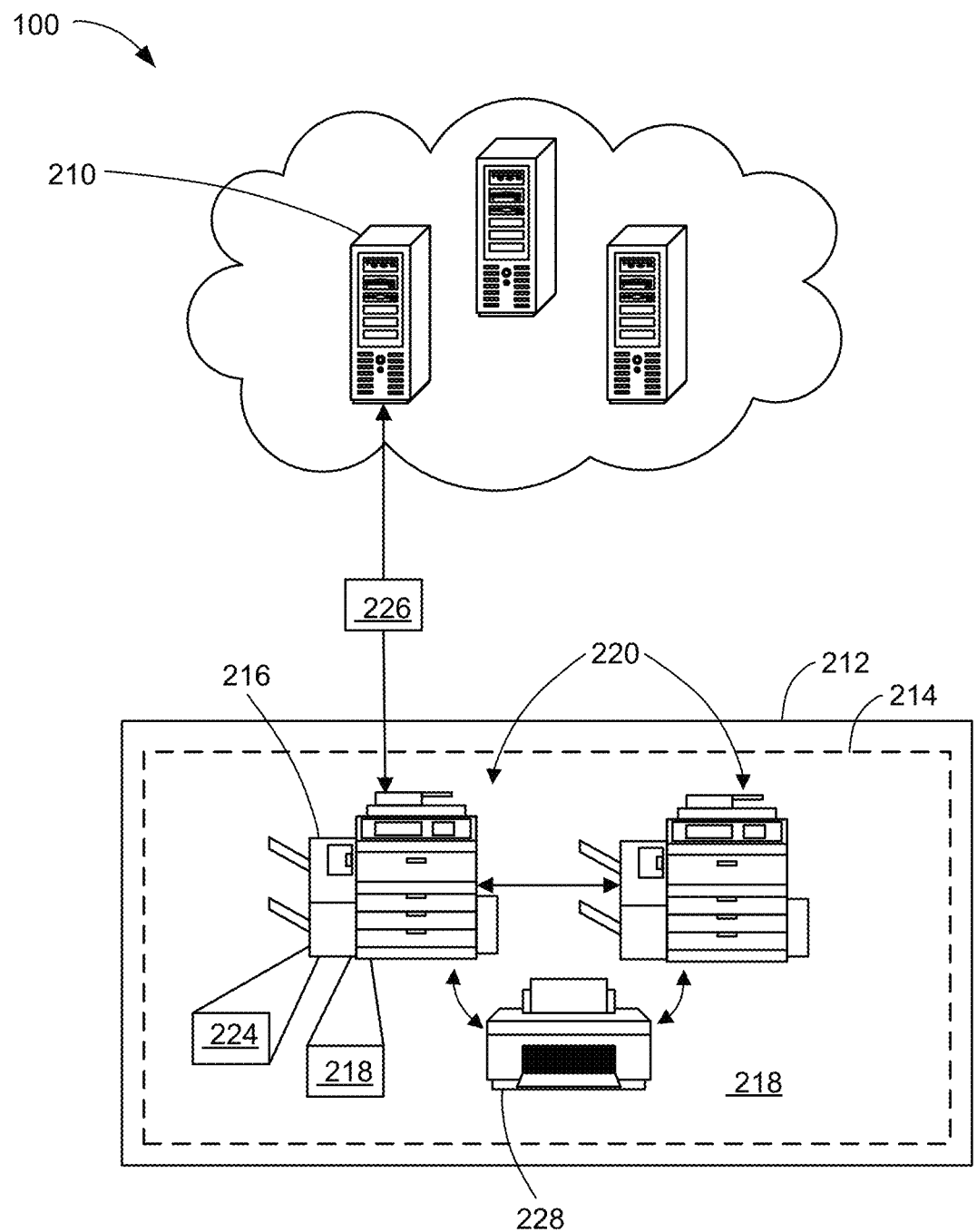
FIG. 2 is an example of the multifunctional platform system.

Referring now to FIG. 2, therein is shown an example of the multifunctional platform system 100. The multifunctional platform system 100 can include a platform management unit 210. The platform management unit 210 is an electronic device or collection of electronic devices capable of remotely managing one or more devices. For example, the platform management unit 210 can be a device management system that can enable remote management of a device and can query a device to obtain or observe operational status, information, or parameters of the device. In another example, the platform management unit 210 can be a repository of profiles for the device and programs for operation on and monitoring of the device. Each of these features will be described in greater detail below.

The platform management unit 210 can be a cloud based system that includes a device or group of devices, such as a computer, server, or computer network that is accessible over the internet, World Wide Web, or a combination thereof. In general, the cloud based system can be dynamically scalable with virtualized resources and provide computer or other device services that are accessible remotely from or through a web browser while software, information, data, or a combination thereof are stored on servers in the cloud. As an example, a cloud system can support infrastructure for device services and monitoring, platform for the device services and monitoring, software for the device services and monitoring, or a combination thereof. The second device 106 of FIG. 1 can be or include the platform management unit 210 or portions of the platform management unit 210.

The platform management unit 210 can be in communication with one or more networks, including a closed network 212. The closed network 212 is a network of computers, electronic devices, electronic appliances, or a combination thereof that is not accessible by the public. For example, the closed network 212 can be a network protected by a network firewall 214 that can include computers coupled to peripheral devices, such as multifunctional printers, copiers, fax machines, or a combination thereof.

The network firewall 214 is a computer system or computer network that is designated to block unauthorized access while permitting authorized communications. For example, the network firewall 214, which can be implemented in hardware, software, or a combination thereof, can prevent unauthorized network users, such as internet users, from accessing the closed network 212 or private devices connected to the closed network 212 such as peripheral devices and appliances connected to cloud servers or cloud based system. As a specific example, messages or communications entering or leaving the closed network 212 pass through the network firewall 214 which examines each message or communication and blocks those messages that do not meet a specified security criteria.

The closed network 212 can include the first device 102 of FIG. 1 as an agent host device 216. The agent host device 216 is an electronic device capable of communicating with a cloud based device or service and interfacing with other devices on a network behind a firewall. The agent host device 216 can securely transmit to and receive information from the platform management unit 210 through the network firewall 214. As an example, the agent host device 216 can be a cloud ready device.

The cloud ready device is an electronic device with native support for connecting to cloud services or cloud based system. For example, the agent host device 216 can be cloud ready when an intermediate or additional computer connection is not needed for enabling communication or connection to the cloud based system, such as the platform management unit 210. As a specific example, the agent host device 216 can be registered with the platform management unit 210 for authorized communication and information transfer through the network firewall 214.

The agent host device 216 can include a device smart agent 218. The device smart agent 218 is a software program that acts or functions for an electronic device in order to accomplish a task, perform a designated function, enable secure communication to devices or services outside of a protected network, or a combination thereof. For example, the device smart agent 218 can enable a remote electronic device located outside of the network firewall 214, such as the platform management unit 210, to communicate with, manage, obtain, or observe the operational status, information, or parameters of the agent host device 216. The device smart agent 218 can also enable similar functionality to other devices that are connected to the agent host device 216 even though the other devices are not cloud ready devices or not capable of communicating with the remote electronic device. These functions will be discussed in detail below.

For illustrative purposes, the agent host device 216 is shown as a multifunctional peripheral device, although it is understood that the agent host device 216 can be a different type of device. For example, the agent host device 216 can be an electronic device including computers; other types of multifunctional peripheral devices such as copiers, or fax machines; appliances such as refrigerators, microwaves or coffee machines; or a combination thereof.

The agent host device 216 can be one of many agent enabled devices 220 on the closed network 212 that can be coupled to one another to communicate and exchange information with one another, as depicted by the double headed arrow. The agent enabled devices 220 are devices that are capable of supporting and running an instance of the device smart agent 218.

The agent enabled devices 220 can function independently or in cooperation with other instances of the agent enabled devices 220, such as the agent host device 216, to process requests from the platform management unit 210. For example, the device smart agent 218 of the agent host device 216 can communicate with the device smart agent 218 of another instance of the agent enabled devices 220 to exchange information, partition tasks, or process requests from the platform management unit 210. These features will be discussed in detail below.

The agent enabled devices 220, including the agent host device 216, can perform primary device functions 224. The primary device functions 224 are functions the device was designed to perform and support capabilities to perform those functions. As an example, for a multifunctional peripheral device, the primary device functions 224 can include receiving and processing tasks to print, copy, scan, or fax or a combination thereof. The support capabilities for a multifunctional peripheral device can include functions such as determining and presenting the status of the multifunctional peripheral device, such as low toner levels or paper jams; and communication with other devices through a network to receive the tasks. As another example, the primary device functions 224 for the agent enabled device 220 that is a refrigeration unit can include regulating and maintaining interior temperature and humidity, making and dispensing ice, dispensing water, or a combination thereof. The support capabilities of the refrigeration unit can include providing notifications for and monitoring filter performance, monitoring coolant levels, or a combination thereof. In a further example, the primary device functions 224 for a cloud enabled multifunctional peripheral device can include processing tasks received through a cloud system, such as a cloud printing service.

The device smart agent 218 can enable the platform management unit 210 to monitor and manage the agent host device 216 with a management request 226. The management request 226 is a request related to maintaining and managing one or more devices on a network. In general, the management request 226 is not a request to perform the device primary functions 224. For example, the management request 226 can include a request to determine the available system resources, such as central processing unit utilization or memory consumption. In another example, the management request 226 can include a request to retrieve information, manage, or monitor devices that cannot communicate directly with the platform management unit 210. In a further example, the management request 226 can include requests to install, configure, monitor, or update software plug-ins and agents specific to the plug-ins, or a combination thereof.

Software plug-ins generally refer to a set of software components that add abilities to a larger software application and can allow customizing the functionality of the application. For example, a software plug-in for a cloud enable device can modify or expand the capability of and access to a printer to receive print jobs from a cloud service.

An agent for the plug-ins generally refer to a software program that acts or functions for an electronic device or other program in order to accomplish a task, perform a designated function, or a combination thereof. For example, the agent for a software plug-in that enables cloud printing can be authorized to determine and report a status of each printing device registered with the cloud and then post this status information to a cloud web server.

The management request 226 can be processed by the agent host device 216 alone divided between the agent host device 216 and a further instance of the agent host device 216, by joint or cooperative processing by both the agent host device 216 and the further instance of the agent host device 216, or a combination thereof. The management request 226 can also be for monitoring and management of a non-agent device 228.

The non-agent device 228 is a device that is incompatible with or incapable of supporting the device smart agent 218. For example, the non-agent device 228 can be a device that does not include the hardware components, operating system, or software necessary to run or support the agent. The non-agent device 228 may not be a cloud ready device even though the non-agent device 228 is a web connected device because it does not have the ability to directly communicate with the platform management unit 210. In general, the "web connected" device can be a device connected to a computer or computer network and can be a device that provide users with access to certain web services, such as from the on-device display.

For illustrative purposes, the non-agent device 228 is depicted as a printing device, although it is understood that the non-agent device 228 can be a different device. For example, the non-agent device 228 can be a computer, a fax machine, copy machine, or an electronic appliance, such as a refrigerator, microwave or coffee machine.

The closed network 212 can include the non-agent device 228 coupled to the agent enabled devices 220, including the agent host device 216 as depicted by the curved double headed arrows. The device smart agent 218 of the agent enabled devices 220 can communicate with the non-agent device 228 to exchange information. For example, the device smart agent 218 can send and receive information to the non-agent device 228 based on the management request 226 received from the platform management unit 210.

The multifunctional platform system 100 can enable each of the above described functions and features. These functions and features described above will be discussed in detail below.

Figure 3:
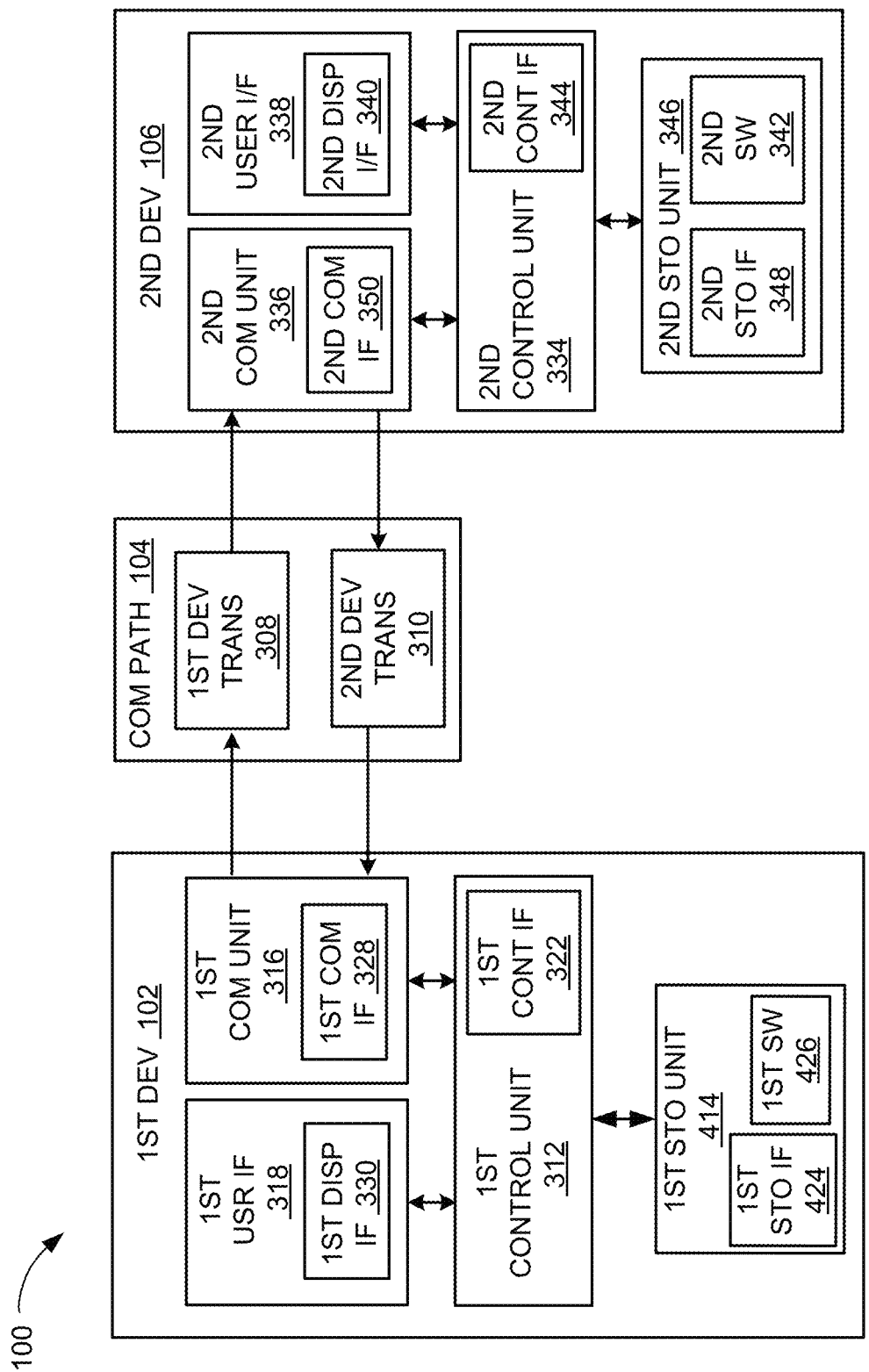
FIG. 3 is an exemplary block diagram of the multifunctional platform system.

Referring now to FIG. 3, therein is shown an exemplary block diagram of the multifunctional platform system 100. The multifunctional platform system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the multifunctional platform system 100 is shown with the first device 102 as a client device, although it is understood that the multifunctional platform system 100 can have the first device 102 as a different type of device. For example, the first device 102 can be a server having a display interface.

Also for illustrative purposes, the multifunctional platform system 100 is shown with the second device 106 as a server, although it is understood that the multifunctional platform system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the multifunctional platform system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information such specifications and details for hardware and software of the first device 102.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the multifunctional platform system 100. The first control unit 312 can also execute the first software 326 for the other functions of the multifunctional platform system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the multifunctional platform system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the multifunctional platform system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store relevant information such as specifications and details for hardware and software of the first device 102, the second device 106, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the multifunctional platform system 100 is shown with the second storage unit 346 as a single hierarchy storage system, although it is understood that the multifunctional platform system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The multifunctional platform system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the multifunctional platform system 100 is described by operation of the first device 102 and the second device 106. It is understood that the first device 102 and the second device 106 can operate any of the modules and functions of the multifunctional platform system 100.

Figure 4:
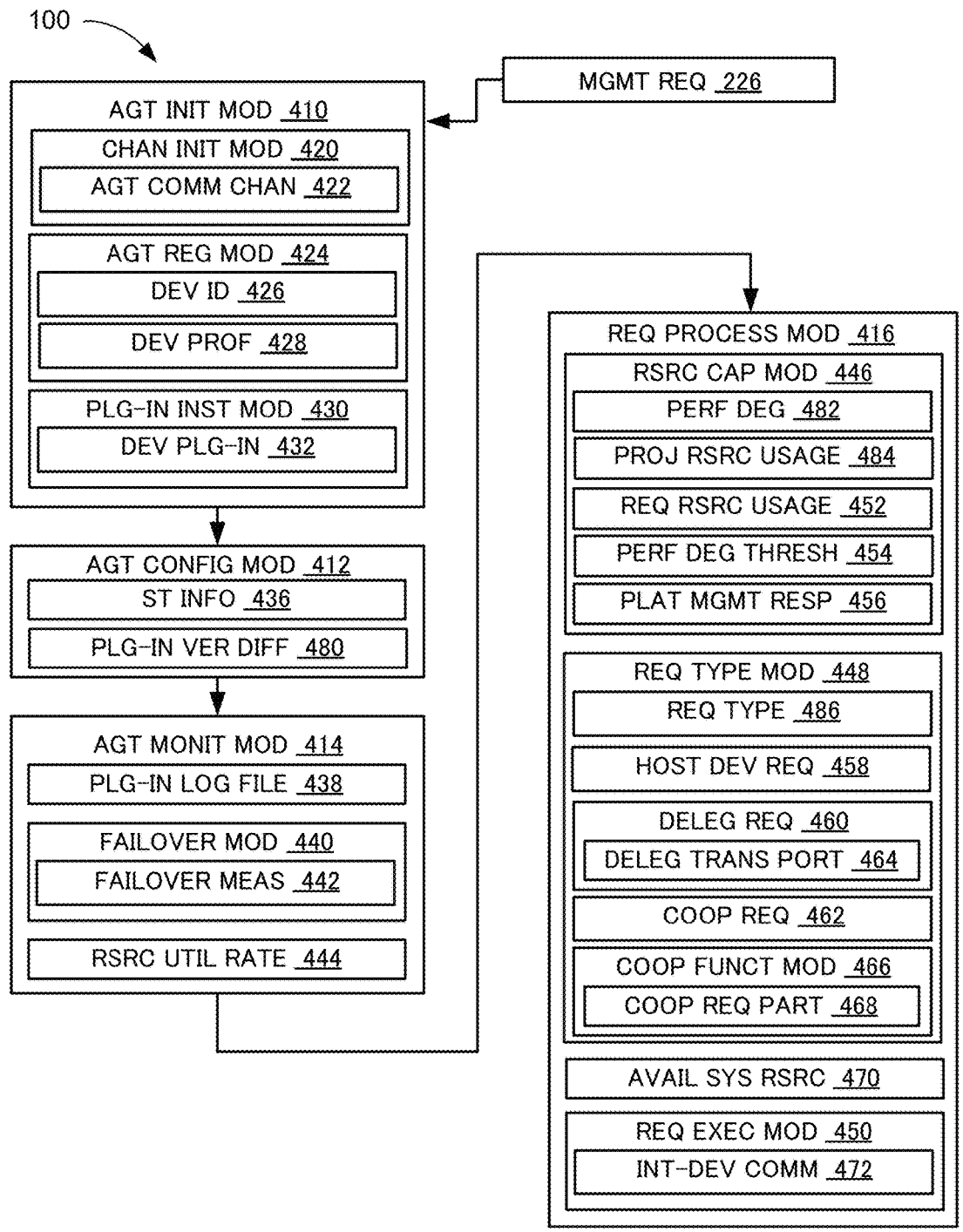
FIG. 4 a control flow of the multifunctional platform system.

Referring now to FIG. 4, therein is shown a control flow of the multifunctional platform system 100. The multifunctional platform system 100 can include an agent initiation module 410, an agent configuration module 412, an agent monitoring module 414, and a request process module 416. The agent configuration module 412 can be coupled to the agent initiation module 410. The agent monitoring module 414 can be coupled to the agent configuration module 412. The request process module 416 can be coupled to the agent monitoring module 414.

The agent initiation module 410 is for establishing a communication channel and registration of the device with a device management system or service and retrieving specified plug-ins for the device. The agent initiation module 410 can accomplish these functions with a channel initiation module 420, an agent registration module 424, and a plug-in installation module 430.

The channel initiation module 420 is for establishing a communication channel between the device and device management system. For example, upon installation, activation, or a combination thereof of the device smart agent 218 on the agent host device 216, the device smart agent 218 can implement the channel initiation module 420 to establish an agent communication channel 422 between the agent host device 216 and the platform management unit 210.

The agent communication channel 422 is a communication channel that enables secure information exchange between a device and a device management service. For instance, the agent communication channel 422 can enable the platform management unit 210 to communicate with the agent host device 216 even when direct information exchange is not possible due to the network firewall 214. In an example, the device smart agent 218 can provide secure communication with the agent communication channel 422 by periodically polling or communicating with the platform management unit 210 at regular intervals through the agent communication channel 422 for the management request 226, which can be stored on the platform management unit 210 until retrieved by the device smart agent 218. In another example, the platform management unit 210 can notify the device smart agent 218 of the management request 226 when the device smart agent 218 initiates communication or the device smart agent 218 discovers the management request 226 on the platform management unit 210.

The agent communication channel 422 can include features to provide secure information exchange. For example, the agent communication channel 422 can be implemented as an encrypted link between the platform management unit 210 and the agent host device 216, such as with secure sockets layer (SSL) security technology. In another example, the agent host device 216 can be registered to a specific user account that provides access to communication through the agent communication channel 422 to authorized users.

The agent registration module 424 is for registering the device with the device management system. For example, the device smart agent 218 can initiate registration of the agent host device 216 with the platform management unit 210 by transmitting a device identifier 426 to the platform management unit 210. The device identifier 426 can be an identifier that is unique to the agent host device 216 such as a serial number or code. To continue the example, the platform management unit 210 can register the agent host device 216 by matching the device identifier 426 with a device profile 428 specific to the agent host device 216.

The device profile 428 is a profile that includes details and configuration information about the device. For example, the device profile 428 can include, but is not limited to, device specifications, such as hardware and technical specifications; operational capabilities; device model numbers or identifiers such as serial numbers; or a combination thereof. In another example, the device profile 428 can include, but is not limited to, details about device functional features and capabilities, software and operating system versions and configurations, programs and plug-ins for running and operation on the agent host device 216, or a combination thereof.

The registration of the agent host device 216 can be complete when the platform management unit 210 matches the device identifier 426 with the device profile 428 and establishes that the device smart agent 218 is prepared to receive the management request 226 from the platform management unit 210. Registration of the agent host device 216 can include the device smart agent 218 receiving the device profile 428 corresponding to the agent host device 216 from the platform management unit 210. The device profile 428 can be received by the device smart agent 218 through the agent communication channel 422. Once the agent communication channel 422 has been established, the agent host device 216 is registered with the platform management unit 210, or a combination thereof, the device smart agent can receive the management request 226 from the platform management unit 210. For example, the device smart agent 218 can receive the management request 226 for processing by agent initiation module 410, the agent configuration module 412, the agent monitoring module 414, the request process module 416, or a combination thereof.

Following registration of the agent host device 216 with the platform management unit 210, the device smart agent 218 can implement the plug-in installation module 430 to retrieve, and install specified plug-ins and associated agents. For example, the device smart agent 218 can review the device profile 428 to identify designated versions of device plug-ins 432 for installation on the agent host device 216.

The device plug-ins 432 can be sets of software components that add specific abilities, functionality, or features to a larger software application or device. The device plug-ins 432 can allow customization of the functionality of the application or device. For example the device plug-ins 432 can be programs that enable cloud based functionality, such as processing print jobs from a cloud printing service.

Once the designated version of the device plug-ins 432 are identified, the device smart agent 218 can implement the plug-in installation module 430 to retrieve the designated version of the device plug-ins 432 from the platform management unit 210 through the agent communication channel 422. The device smart agent 218 can receive and install each of the device plug-ins 432 in accordance with the device profile 428. Each of the device plug-ins 432 that have been installed on the agent host device 216 can then be configured by the agent configuration module 412.

The agent configuration module 412 is for validating, modifying, and adjusting configurations of the agents or plug-ins based on the profile associated with the device. The agent configuration module 412 can validate the device plug-ins 432 that have been installed on the agent host device 216. For example, upon retrieval and installation of the device plug-ins 432, the agent configuration module 412 can provide state information 436 for each of the device plug-ins 432 to validate there are no errors to the configurations for the device plug-ins 432 based on the device profile 428. The validation of the device plug-ins 432 can be initiated by the management request 226 from the platform management unit 210 or initiated by the device smart agent 218, which can publish the state information 436 following installation and validation of the device plug-ins 432.

The state information 436 is information related to the operational or status of software plug-ins and associated agents. For example, the operational status of the device plug-ins 432 or indication of when the device plug-ins 432 are in an error state. In another example, the state information 436 can include information indicating the running state of the device plug-ins 432. In a further example, the state information 436 can include an indication of feature availability of the device plug-ins 432, such as when a feature is available for external consumption.

Modifications and adjustment to the device plug-ins 432 can be implemented by the agent configuration module 412 based on changes to the device profile 428. The platform management unit 210, the device smart agent 218, or a combination thereof can determine when the device profile 428 has been changed. For example, the device smart agent 218 can implement the agent configuration module 412 to periodically poll or query the platform management unit 210 for changes to the device profile 428. In another example, the platform management unit 210 can notify the device smart agent 218 when the device profile 428 has been changed. In both of the preceding examples, the device smart agent 218 can implement the agent configuration module 412 to identify changes to the device profile 428 and synchronize the device plug-ins 432 with the device profile 428.

In one example, when the agent configuration module 412 determines the device profile 428 has been changed and the version of the device plug-ins 432 associated with the device profile 428 no longer matches the installed version of one or more of the device plug-ins 432, the agent configuration module 412 can synchronize the device plug-ins 432 by update or downgrade the versions of the device plug-ins 432 to match that of the device profile 428. As a specific example, the device smart agent 218 can implement the agent configuration module 412 to modify the installed version of the device plug-ins 432 based on plug-in version differences 480. The plug-in version differences 480 are the components or portions of the installed version of the device plug-ins 432 that differ from the device plug-ins 432 associated with the device profile 428. To continue the specific example, the agent configuration module 412 can modify or update the components or portions of the installed version of the device plug-ins 432 corresponding to the plug-in version differences 480 to match the version associated with the device profile 428 rather than uninstalling or replacing the installed version of the device plug-ins 432. More specifically, the agent configuration module 412 can uninstall the extra components or portions or install the missing components or portions of the installed version of the device plug-ins 432 according to the plug-in version differences 480 while leaving the overlapping components or portions of the installed version of the device plug-ins 432.

In another example, when the agent configuration module 412 determines the device profile 428 has been changed and no longer includes one or more of the device plug-ins, the agent configuration module 412 can synchronize by removing those instances of the device plug-ins 432. In a further example, when the agent configuration module 412 determines that new instances of the device plug-ins 432 have been added to the device profile 428, the agent configuration module 412 can retrieve and install the new instances of the device plug-ins 432.

The agent monitoring module 414 is for monitoring the status of the plug-ins installed on the device and determining the utilization rate of the agent device. The agent monitoring module 414 can monitor the status of the device plug-ins 432 to provide the state information 436. The device smart agent 218 can analyze plug-in log files 438, such as unstructured log files, to for errors or exceptions.

In one example, the agent monitoring module 414 can enable the device smart agent 218 to introspect each of the device plug-ins 432 to determine the state information 436. In another example, the agent monitoring module 414 can the retrieve plug-in log files 438 from the device plug-ins 432 for analysis by the device smart agent 218. The plug-in log files 438 can include information that can be analyzed or processed to determine exceptions and error states, such as network errors, memory errors, or disk usage errors.

The agent monitoring module 414 can include a plug-in failover module 440. The failover module 440 is for providing a failover measure 442 upon failure or abnormal termination of the device plug-ins 432 or the device smart agent 218. For instance, the failover measure 442 can be a redundant, back-up, or standby system for a program or application, such as the device plug-ins 432. The failover module 440 can provide the failover measure 442 in a number of different ways. In one example, upon detection of the device smart agent 218 or the device plug-ins 432 failure to handle or process the management request 226, the failover module 440 can send a notification of the failure to the platform management unit 210. To continue the example, the platform management unit 210 can receive the notification of failure and transmit the management request 226 for processing by another instance of the agent host device 216.

In another example, when the agent monitoring module 414 detects failure of one or more of the device plug-ins 432 during continuous monitoring of the device plug-ins 432, such as with a "heartbeat" monitoring system, the agent monitoring module 414 can notify the device smart agent 218 which can implement the failover module 440. To continue the example, the failover module 440 can interface with a redundant or backup system having redundant functionality for the device plug-ins 432 that have failed, such as the platform management unit 210 or system on the closed network 212. The redundant or backup system can include copies of the device plug-ins 432. To further the example, the failover module 440 can utilize the redundant or back-up system to provide the functionality of the device plug-ins 432 until the device plug-ins 432 on the agent host device 216 have been restored.

The agent monitoring module 414 can determine the performance and workload of the agent host device 216 based on a resource utilization rate 444. The resource utilization rate 444 is a measure of the amount of system resources being used or consumed. For example, the resource utilization rate 444 can be a measure of the total memory consumption of the agent host device 216, the total central processing unit (CPU) usage of the agent host device 216, or a combination thereof.

The agent monitoring module 414 can determine the resource utilization rate 444 by checking the total memory consumption of the agent host device 216, the total CPU usage of the agent host device 216, such as the first control unit 312 of FIG. 3. The resource utilization rate 444 can include the actual, expected, or estimated memory and CPU consumption rate of the agent host device 216 for each of the device plug-ins 432, the primary device functions 224, or a combination thereof.

The device smart agent 218 can implement the agent monitoring module 414 to determine the resource utilization rate 444 at periodic intervals or when the agent host device 216 processes or performs the primary device functions 224. Upon request, such as with the management request 226, the device smart agent 218 can transmit the resource utilization rate 444 to the platform management unit 210 through the agent communication channel 422.

The request process module 416 is for processing requests to manage devices on the network. The device smart agent 218 can implement the request process module 416 to process the management request 226 with a resource capacity module 446, a request type module 448, and a request execution module 450.

The resource capacity module 446 is for determining a performance degradation 482 for the primary device functions 224 of the agent host device 216 based on execution of the management request 226. The performance degradation 482 is an indicator for performance reduction or degradation of a device function. In general, the performance degradation 482 can be determined as the reduction in the capability, such as processing power or storage capacity, of the agent host device 216 to perform the primary device functions 224. For example of the performance degradation 482 can be determined as delays for processing of or response to requests for performing the primary device functions 224. In another example, the performance degradation 482 can be determined by the reduction of communication bandwidth to other devices on the closed network 212, such as the non-agent device 228, the agent enabled devices 220, including other instances of the agent host device 216, or a combination thereof.

The resource capacity module 446 can determine the performance degradation 482 based on a projected resource usage 484. The projected resource usage 484 is an estimation of the total resource usage from processing of the primary device functions 224, functions associated with the primary device functions 224, and the management request 226.

The resource capacity module 446 can calculate the projected resource usage 484 based on a request resource usage 452 of the management request 226, the resource utilization rate 444, and a performance degradation threshold 454. More specifically, the resource capacity module 446 can calculate the projected resource usage 484 as the sum of the request resource usage 452 and the resource utilization rate 444.

The request resource usage 452 is an estimate of the amount of system resources needed to execute the management request 226. For example, the request resource usage 452 can be the amount of CPU power of the agent host device 216 that will be consumed or memory of the agent host device 216 that will be utilized for execution of the management request 226.

The resource capacity module 446 can determine the performance degradation 482 based on the projected resource usage 484 when the projected resource usage 484 exceeds a performance degradation threshold 454. The performance degradation threshold 454 is a threshold of resource consumption for a device that, when exceeded, will degrade the performance or functionality of the primary features of the device. For example the performance degradation threshold 454 can represent a limit or percentage of memory capacity or CPU loading or usage rate that, when exceeded, would interfere or degrade the performance of the primary device functions 224.

The device smart agent 218 can take a number of actions when the resource capacity module 446 determines that execution of the management request 226 will cause the performance degradation 482 of the primary device functions 224. In one example, the device smart agent 218 can generate a platform management response 456, which is a communication from the device smart agent 218 to the platform management unit 210 related to the management request 226. In this situation, the platform management response 456 can be an alert that states execution of the management request 226 will degrade the performance of the primary device functions 224 of the agent host device 216. The platform management response 456 can include a request further instructions or permission take a different action, such as delay execution, reallocate, or delegation of the management request 226.

In another example, the device smart agent 218 can take action independent of the platform management unit 210. As a specific example, the device smart agent 218 can delay execution of the management request 226 until the sum of the resource utilization rate 444 and the request resource usage 452 does not exceed the performance degradation threshold 454. In another specific example, the device smart agent 218 can divide, reallocate, or delegate the management request 226 to the device smart agent 218 of another instance of the agent host device 216, which will be described in detail below.

The device smart agent 218 can implement the request type module 448 to determine a request type 486 of the management request 226 based on the performance degradation 482. For example, when the resource capacity module 446 determines that the projected resource usage 484 will remain below the performance degradation threshold 454 and avoid performance degradation 482 of the primary device functions 224, the device smart agent 218 can implement the request type module 448 to determine the request type 486 of the management request 226. For example, the request type module 448 can determine request type 486 of the management request 226 as a host device request 458, a delegation request 460, or a cooperative request 462.

The host device request 458 is a request related to the management, status, or operation of the agent host device 216. In general, the host device request 458 involve management of the agent host device 216. For example, the host device request 458 can be a request to determine and report the resource utilization rate 444 of the agent host device 216. In another example, the host device request 458 can be a request to report the state information 436 for the device plug-ins 432. As a further example, the host device request 458 can be a request to receive updates to the device profile 428 or update the configurations of the of the device plug-ins 432.

The delegation request 460 is a request to monitor and manage other devices on the network. In general, the delegation request 460 can be a request to manage or get information from devices other than the agent host device 216 using the device smart agent 218. More specifically, the delegation request 460 can be a request by the platform management unit 210 to gather information or manage devices on the closed network 212 that would normally be inaccessible to the platform management unit 210. The inaccessibility can be because the device does not support or is incapable of supporting an instance of the device smart agent 218 or due to the network firewall 214 or other security protocols of the closed network 212. The inaccessibility can be overcome with the security features of the device smart agent 218, such as the agent communication channel 422, which can authorize the platform management unit 210 to gather information or manage devices on the closed network 212.

The delegation request 460 can be a request for the device smart agent 218 of the agent host device 216 to manage, monitor, or retrieve information from the non-agent device 228 or the closed network 212. In one example, the delegation request 460 can be a request for the device smart agent 218 to aggregate and analyze information from multiple instances of the non-agent device 228. In another example, the delegation request 460 can include requests to manage or monitor devices that are of the same or different type than the agent host device 216. As a specific example, the delegation request 460 can include a request to retrieve information from the non-agent device 228, such as the toner level or maintenance logs of a multifunctional peripheral device or water filter capacity of a refrigerator. In a further example, the delegation request 460 include management, monitoring, retrieve information or a combination thereof of the closed network 212 such as a request to check internet protocol ("IP") address ranges for discover of new devices on the closed network 212.

The delegation request 460 can include a delegation transmission portion 464, which is the portion of the delegation request 460 that is transmitted to the other devices on the network that are not agent enabled. In the example of the delegation request 460 to aggregate and analyze information from multiple instances of the non-agent device 228, the delegation transmission portion 464 can be the request for information that is transmitted to and received from the non-agent device 228. As an example, the device smart agent 218 can transmit and receive the delegation transmission portion 464 through standard network protocols, such as simple network management protocol (SNMP).

The cooperative request 462 is a request that involves utilizing the device smart agent 218 of multiple instances of the agent enabled devices 220. For example, the cooperative request 462 can be a task that is distributed or divided amongst the device smart agent 218 of multiple instances of the agent enabled devices 220 on the closed network 212. The cooperative request 462 can enable parallel processing of multiple subsets of information or data, which can be subsequently aggregated and analyzed by the platform management unit 210 or the device smart agent 218.

The cooperative request 462 can include cooperative request partitions 468, which are the divisions of the cooperative request 462 portioned for execution by the device smart agent 218 of each of the agent enabled devices 220. As an example, for the cooperative request 462 for device discovery or configuration of devices on the closed network 212, the cooperative request partitions 468 can be the assignment of different specified IP address ranges for the device smart agent 218 of each of the agent enabled devices 220.

The cooperative request partitions 468 of the cooperative request 462 can be generated by the platform management unit 210 or the device smart agent 218 with a cooperative function module 466. The request process module 416 can include the cooperative function module 466, which is for dividing a request among multiple device agents.

The platform management unit 210 or the device smart agent 218 can implement the cooperative function module 466 to generate the cooperative request partitions 468 in order to balance the load of the management request 226 amongst the agent enabled devices 220 on the closed network 212. For example, the management request 226 can be divided or partitioned based on available device resources 470 of each of the agent enabled devices 220 on the closed network 212, including the agent host device 216 and one or more other instances of the agent host device 216. As a specific example, the cooperative function module 466 can assign or portion a larger portion of the management request 226 to the agent enabled devices 220 having more of the available device resources 470 relative to other instances of the agent enabled devices 220.

The available device resources 470 are a combination of device capability and unused resources of the agent enabled devices 220 that are available for use in executing tasks, the use of which will not degrade the primary device functions 224. For example, the available device resources 470 can be determined as a combination of the device hardware capability, such as processing power or device processing or communication bandwidth, and the difference between the resource utilization rate 444 and the performance degradation threshold 454.

In the example of the device smart agent 218 generating the cooperative request 462, the device smart agent 218 can implement the cooperative function module 466 to generate the cooperative request partitions 468 of the cooperative request 462 from the management request 226 when the device smart agent 218 of the agent host device 216 determines that employing the resources or assistance of the device smart agent 218 of other instances of the agent enabled devices 220 would facilitate or optimize execution of the management request 226. As a specific example, the device smart agent 218 can convert the management request 226 into the cooperative request 462 when the device smart agent 218 determines that executing the management request 226 will exceed the performance degradation threshold 454.

In this situation, the device smart agent 218 implement the cooperative function module 466 to convert the management request 226 to cooperative request 462 by dividing the management request 226 into the cooperative request partitions 468. For example, the cooperative function module 466 can generate the cooperative request partitions 468 such that the request resource usage 452 and resource utilization rate 444 does not exceed the performance degradation threshold 454 of the device smart agent 218 when executing the cooperative request partitions 468 of the cooperative request 462. To continue the example, the cooperative request partitions 468 can be generated from the management request 226 to employ the available device resources 470 of one or more of the agent enabled devices 220, which optimizes the resources of the agent enabled devices 220 on the closed network 212.

The request type module 448 can determine the request type 486 of the management request 226 as the host device request 458, the delegation request 460, or the cooperative request 462 based on a number of factors. For example the factors can include the devices involved in executing the management request 226, the objective of the management request 226, or a combination thereof.

In one instance, the request type module 448 can determine the request type 486 of the management request 226 as the host device request 458 when the management request 226 involves management or monitoring of the agent host device 216. For example, the management request 226 can include the host device request 458 when the management request 226 includes tasks or requests such as to update to the device profile 428, to configure the device plug-ins 432, or to report the resource utilization rate 444 of the agent host device 216 or the state information 436 of the device plug-ins 432. Since the objective of the above examples of the management request 226 is primarily management of the agent host device 216; or the management request 226 is direct to the agent host device or primarily involve the agent host device 216, the request type module 448 can determine that the management request 226 includes the host device request 458.

In another instance, the request type module 448 can determine the request type 486 of the management request 226 as the delegation request 460 when the management request 226 involves management of other devices. For example, the management request 226 can include the delegation request 460 when the management request 226 include tasks or requests for the device smart agent 218 to retrieve and aggregate information from or manage other devices, in particular the non-agent device 228, or retrieve information from the closed network 212. Since the above example involves management of other devices on the closed network 212 or the objective of the management request 226 is primarily management of the non-agent device 228, the request type module 448 can determine that the management request 226 includes the delegation request 460.

In a further instance, the request type module 448 can determine the request type 486 of the management request 226 as the cooperative request 462 when the management request 226 involves the participation of more than one of the agent enabled devices 220 to execute the management request 226. For example, the management request 226 can include the cooperative request 462 when the management request 226 includes tasks or requests that are partitioned or divided amongst the device smart agent 218 of multiple instances of the agent enabled devices 220 on the closed network 212. Since the above example involves the cooperation of the device smart agent 218 of multiple instances of the agent enabled devices 220, the request process module 416 can determine that the management request 226 includes the cooperative request 462.

Once the device smart agent 218 determines the request type 486 of the management request 226 with the request type module 448, the device smart agent 218 can implement the request execution module 450 to execute the management request 226. For the management request 226 that includes the host device request 458, device smart agent 218 can implement the request execution module 450 can take appropriate action to execute the host device request 458 on the agent host device 216.

In the examples of the host device request 458 that includes reporting the resource utilization rate 444 of the agent host device 216 or reporting the state information 436 for one or more of the device plug-ins 432, the request execution module 450 can implement the resource capacity module 446 to determine the resource utilization rate 444 or the agent monitoring module 414 to determine the state information 436, respectively. The device smart agent 218 can then transmit the resource utilization rate 444 or the state information 436 to the platform management unit 210 with the platform management response 456. In the examples of the host device request 458 that include updating the configuration of the device plug-ins 432, the request execution module 450 can implement the agent configuration module 412 to retrieve and review the updated version of the device profile 428, retrieve or download the designated versions or updates for the device plug-ins 432 from the platform management unit 210, and configure the device plug-ins 432 accordingly.

For the management request 226 that includes the delegation request 460, the device smart agent 218 can implement the request execution module 450 to transmit the delegation transmission portion 464 of the delegation request 460 to the non-agent device 228 or other devices on the closed network 212. In the example of the delegation request 460 to aggregate and analyze information from multiple instances of the non-agent device 228, device smart agent 218 can transmit the delegation transmission portion 464 to the non-agent device 228 involved in the delegation request 460 and receive the information in response to the delegation transmission portion 464. The request execution module 450 can then aggregate and analyze the information according to the delegation request 460. As a specific example, the delegation transmission portion 464 that includes a request to provide toner levels or maintenance logs can be transmitted to the instances of the non-agent device 228 that are printers, copy machines, or fax machines. The measurements of toner level can be converted into to a digital representation by the non-agent device 228 or the agent host device 216 for transformation into a visual representation of the toner level on a graphical user interface.

For the management request 226 that includes the cooperative request 462, the device smart agent 218 of the platform management unit 210 can implement the request execution module 450 to execute the cooperative task partitions 468 assigned to the agent host device 216, transmit the cooperative task partitions 468 of the cooperative request 462 for execution on the agent enabled devices 220, such as an additional or further instance of agent host device 216 or a combination thereof.

An inter-device communication 472 can be generated by the request execution module 450 to include portions of the management request 226 for transmission to the non-agent device 228 or the further instance of the agent host device 216 based on the request type 486. For example, device smart agent 218 can implement the request execution module 450 to generate the inter-device communication 472 to include the delegation transmission portion 464 or the cooperative request 462 when the request type 486 of the management request 226 includes the delegation request 460 or the cooperative request 462, respectively.

The inter-device communication 472 is the communication between devices on the closed network 212 associated with management request 226. For example, the inter-device communication 472 can be a portion of the management request 226 that has been processed by the device smart agent 218 and is directed toward the other devices. As a specific example, the device smart agent 218 can implement the request process module 416 to generate the inter-device communication 472 to include the delegation transmission portion 464 or the cooperative request partitions 468 when the management request 226 includes the delegation request 460 or the cooperative request 462, respectively. The device smart agent 218 can transmit the inter-device communication 472 with the first communication unit 316 of FIG. 3.

The delegation transmission portion 464 of the delegation request 460 and the cooperative request partitions 468 of the cooperative request 462 can be transmitted to the respective devices, such as the non-agent device 228, additional or further instance of agent host device 216, other devices on the closed network 212, or a combination thereof, with the inter-device communication 472.

The inter-device communication 472 can include communication from the non-agent device 228, the agent enabled devices 220, to the device smart agent 218 of the host agent device 216. For example, the inter-device communication 472 can be a communication that provides a response to the delegation request 460, such as the toner level of the non-agent device 228, or the cooperative request partitions 468 of the cooperative request 462.

It has been discovered that the cooperative request 462 can enable scalability and optimize execution of the management request 226. The cooperative request 462 can take advantage of the available device resources 470 of each of the agent enabled devices 220 by dividing the management request 226 into the cooperative request partitions 468, which enables scalability of the scope of the management request 226 and optimizes the use of the agent enabled devices 220.

It has also been discovered that the agent communication channel 422 improves security and reduces redundancy. The agent communication channel 422 provides a single security communication channel for all of the device plug-ins 432 for the agent host device 216 and eliminates the need for each of the device plug-ins 432 have its own agent for communication through the network firewall 214, which improves security and reduces redundancy.

It has further been discovered that the device smart agent 218 can improve remote management of devices on the closed network 212 with the delegation request 460. The delegation request 460 can be routed through and executed by the device smart agent 218. This enables the platform management unit 210 to access or request information from devices that it would not have access to otherwise, such as the non-agent device 228, because the devices are not cloud enabled or due to the network firewall 214, which improves remote management of the devices on the closed network 212.

The multifunctional platform system 100 has been described with module functions or order as an example. The multifunctional platform system 100 can partition the modules differently or order the modules differently. For example, the first software 326 of FIG. 3 of the first device 102 of FIG. 3 can include the modules for the multifunctional platform system 100. As a specific example, the first software 326 can include the agent initiation module 410, the agent configuration module 412, the agent monitoring module 414, the request process module 416, and associated sub-modules included therein. As another specific example, the first software 326 can include the device smart agent 218.

The first control unit 312 of FIG. 3 can execute the first software 326 or implement the device smart agent 218 to operate the modules as described above. For example, the device smart agent 218 can implement the agent initiation module 410, which includes the channel initiation module 420, agent registration module 424, and plug-in installation module 430, to initiate the agent communication channel 422, register the agent host device 216 with the platform management unit 210, and install the device plug-ins 432 on the agent host device 216, respectively.

In another example, the device smart agent 218 can implement the agent configuration module 412 to configure the device plug-ins 432, implement the agent monitoring module 414 to obtain state information 436 from or provide the failover measure 442 for the device plug-ins 432. In a further example, the device smart agent 218 can implement the request process module 416 to execute the associated functions, such as calculating a projected resource usage 484 for the agent host device 218 based on execution of the management request 226; determining with the first control unit 312 the performance degradation 482 of the primary device function 224 of the agent host device; or determining the request type 484 of the management request 226 based on the performance degradation 482.

In another example of module partitions, the second software 342 of FIG. 3 of the second device 106 of FIG. 3 can include the modules for the multifunctional platform system 100. As a specific example, the second software 342 can include the agent initiation module 410, the agent configuration module 412, the agent monitoring module 414, the request process module 416, and associated sub-modules included therein.

The second control unit 334 of FIG. 3 can execute the second software 342 or implement the device smart agent 218 to operate the modules. For example, the device smart agent 218 can implement the agent initiation module 410, which includes the channel initiation module 420, agent registration module 424, and plug-in installation module 430, to initiate the agent communication channel 422, register the agent host device 216 with the platform management unit 210, and install the device plug-ins 432 on the agent host device 216, respectively.

In another example, the device smart agent 218 can implement the agent configuration module 412 to configure the device plug-ins 432, implement the agent monitoring module 414 to obtain state information 436 from or provide the failover measure 442 for the device plug-ins 432. In a further example, the device smart agent 218 can implement the request process module 416 to execute the associated functions, such as calculating a projected resource usage 484 for the agent host device 218 based on execution of the management request 226; determining with the second control unit 334 the performance degradation 482 of the primary device function 224 of the agent host device; or determining the request type 484 of the management request 226 based on the performance degradation 482.

The modules of the multifunctional platform system 100 can be partitioned between the first software 326 and the second software 342. For example, the first software 326 can include the agent initiation module 410, the agent configuration module 412, and the request process module. The first control unit 312 can implement the device smart agent 218 to execute the modules partitioned on the first software 326 as previously described. The second software 342 can include the agent monitoring module 414. The second control unit 334 can implement the device smart agent 218 to execute modules partitioned on the second software 342 as previously described.

The multifunctional platform system 100 can partition the modules differently or order the modules differently. For example, the request process module 416 can come before the agent monitoring module 414. Each of the modules can operate individually and independently of the other modules. Furthermore, data generated in one module can be used by another module without being directly coupled to each other.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the multifunctional platform system 100 or installed as a removable portion of the multifunctional platform system 100.

The physical transformation from management request 226, such as the delegation request 460 that includes a request to determine the toner level of the non-agent device 228 results in the movement in the physical world, such as measurement of the toner level by the non-agent device 228. The measurement in toner level of the non-agent device 228 can be transformed from a physical measurement to a digital graphical depiction of the toner level for displaying on a device, such as the first display interface 330 of FIG. 3 of the agent host device 216, the second display interface 340 of the platform management unit 210, or a combination thereof. Movement in the physical world, such as replacing the toner cartridge of the non-agent device 228, results in changes to the inter-device communication 472 from the non-agent device 228 to the agent host device 216 in reporting the toner level.

The control flow 400 can be a method 400 of operation of the multifunctional platform system 100 that includes: receiving a management request; determining whether a primary device function of an agent host device will be degraded by execution of the management request; determining whether the management request includes a host device request, a delegation request, or a cooperative request when execution of the management request does not cause degradation of the primary device function; generating an inter-device communication when the management request includes the delegation request or the cooperative request; and transmitting the inter-device communication from a device smart agent for receipt by a non-agent device or an agent enabled device.

Figure 5:
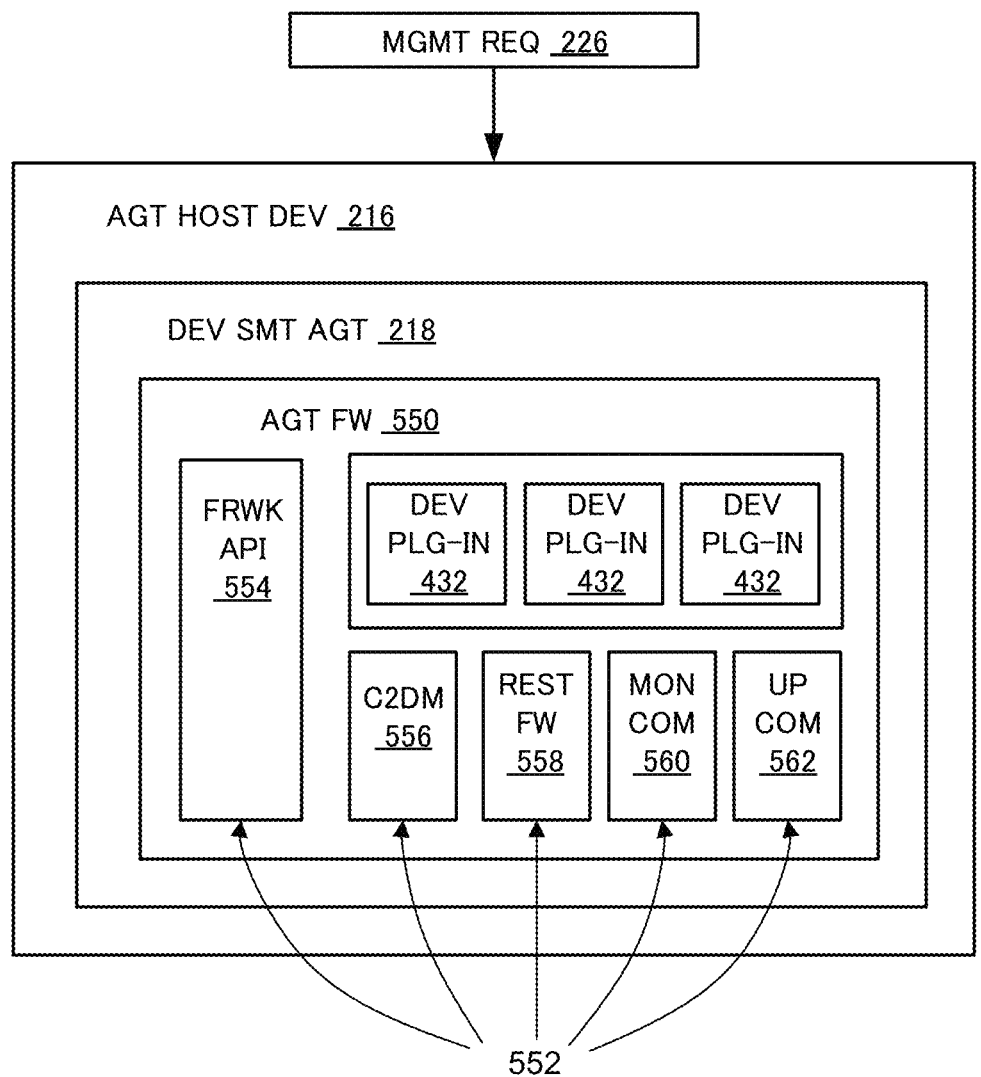
FIG. 5 is an example of the component architecture for the device smart agent of the agent host device.

Referring now to FIG. 5, therein is shown an example of the component architecture for the device smart agent 218 of the agent host device 216. The device smart agent 218 can be installed on the agent host device 216. The device smart agent 218 can include components that enable processing of the management request 226, management of the device plug-ins 432, and operation of the modules of FIG. 4.

The device smart agent 218 can include an agent framework 550 and each of the device plug-ins 432 can be installed on the agent framework 550. The agent framework 550 is a control structure within the device smart agent 218. For example, the agent framework 550 can be the gatekeeper that controls security and transmission of information through the network firewall 214 of FIG. 2 for the device plug-ins 432, such as the device plug-ins 432 that are cloud enabled.

The agent framework 550 can include core components 552 to enable and support the functionality of the device smart agent 218. For example, the core components 552 can include a framework application program interface 554 (framework API); a cloud to device messaging channel 556, which is a channel for communication between the device smart agent 218 and the platform management unit 210 of FIG. 2; a representational state transfer framework 558 ("REST" framework); a monitoring component 560, which is a component for monitoring the status of the device plug-ins; an update component 562, which manages updates and changes to the device plug-ins 432; or a combination thereof.

As a specific example, the agent communication channel 422 of FIG. 4 can be the cloud to device messaging ("C2DM") channel 556 between the device smart agent 218 and the platform management unit 210. In one example, the agent monitoring module 414 can enable each of the device plug-ins 432 to publish the state information 436 through the agent framework 550. In another example, the plug-in installation module 430 of FIG. 4 can install the device plug-ins 432 for each of the device plug-ins 432 that are cloud enabled into the agent framework 550.

In general, the framework API 554 can be an interface that enables communication between software and hardware components within a device or between devices. For example, the framework API 554 can enable communication between the device plug-ins 432 and the core components 552 of the agent framework. In another example, the framework API 554 can enable communication of the device smart agent 218 with other devices on the closed network 212, such as the non-agent device 228 of FIG. 2 and the agent enabled devices 220 of FIG. 2. As a specific example, the framework API 554 can transmit and receive the inter-device communication 472 of FIG. 4.

The REST framework 558 can be software architecture for distributed hypermedia systems such as the internet and World Wide Web (web). In general, for REST architectures, clients initiate requests to servers that process the requests and return responses. These requests and corresponding responses are built around the transfer of "representations" of "resources" such as a document that captures the current or intended state of a resource. The client is generally in a rest state or transitioning between different application states. While in the rest state, the client interacts with the device but creates no load and consumes no per-client storage on the set of servers or on the network. The client begins sending requests when it is ready to transition to a new state. While a request is outstanding, the client is in a transitioning state. The representation of each application state contains links that are used the next time the client chooses to initiate a new state transition.

Each of the core components 552 can be used by the device smart agent 218 to perform functions for managing the device plug-ins 432. For example, the monitoring component 560 can be the core component 552 of the device smart agent 216 that implements the monitoring module 414 of FIG. 4 to interface with the device plug-ins 432 through the framework API 554 to determine the status of the device plug-ins 432. In another example, the update component 562 can be the core component 552 of the device smart agent 216 that implements the agent configuration module 412 of FIG. 4 and interfaces with the platform management unit 210 through the cloud to device messaging channel 556 to retrieve updates for the device plug-ins 432.

Figure 6:
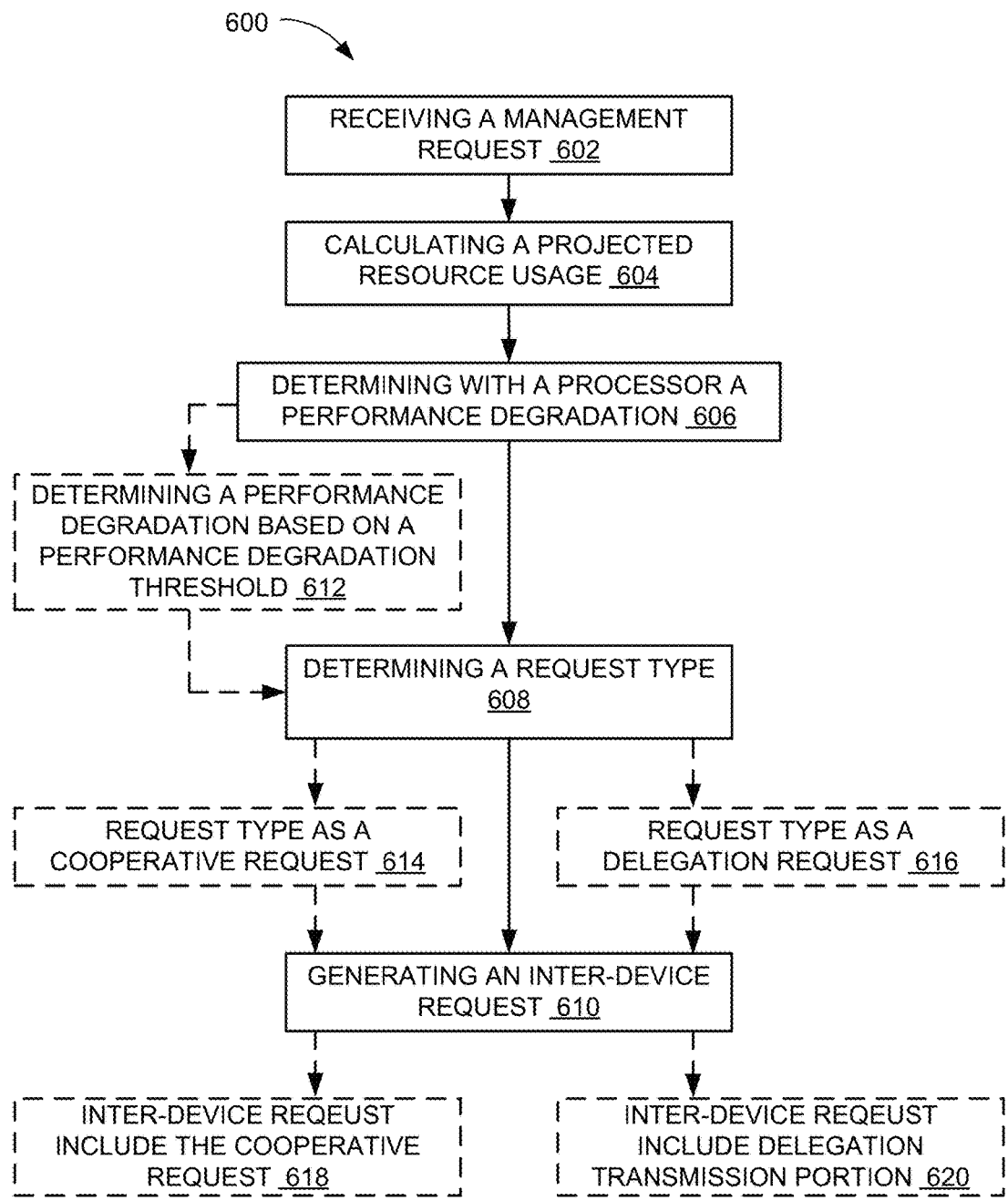
FIG. 6 is an exemplary flow chart of a method of operation of multifunctional platform system in a further embodiment of the present invention.

Referring now to FIG. 6, therein is shown an exemplary flow chart 600 of a method of operation of multifunctional platform system 100 in a further embodiment of the present invention. The multifunctional platform system 100 can implement the exemplary flow chart 600 as described above in FIG. 4.

The exemplary flow chart 600 can include receiving a management request in a step 602. The multifunctional platform system 100 can implement the device smart agent to receive the management request using the agent initiation module 410, the agent configuration module 412, the agent monitoring module 414, the request process module 416, or a combination thereof, all of FIG. 4 as described above.

The exemplary flow chart 600 can further include calculating a projected resource usage for an agent host device based on execution of the management request in a step 604. The multifunctional platform system 100 can implement the device smart agent to calculate the projected resource usage with the request process module 416 of FIG. 4 as described above.

The exemplary flow chart 600 can further include determining with a control unit a performance degradation of a primary device function of the host agent device based on the projected resource usage in a step 606. The multifunctional platform system 100 can implement the device smart agent to determine the performance degradation with the resource capability module 446 of FIG. 4 as described above.

Optionally, the step 606 above can lead to determining the performance degradation based on a performance degradation threshold in a step 612, as depicted by the dashed line and dashed box. The multifunctional platform system 100 can implement the device smart agent to determine the performance degradation based on the performance degradation threshold with the resource capacity module 446 of FIG. 4 as described above.

The exemplary flow chart 600 can further include determining a request type of the management request based on the performance degradation in a step 608. The multifunctional platform system 100 can implement the device smart agent to determine the request type with the request type module 448 of FIG. 4 as described above.

Optionally, the step 608 above can lead to determining the request type as a cooperative request in a step 614 or as a delegation request in a step 616, as depicted by the dashed line and dashed box. The multifunctional platform system 100 can implement the device smart agent to determine the request type as the cooperative request or the delegation request with the request type module 448 of FIG. 4 as described above.

The exemplary flow chart 600 can further include transmitting the inter-device communication from a device smart agent for receipt by a non-agent device or an agent enabled device in a step 610. The multifunctional platform system 100 can implement the device smart agent to transmit the inter-device communication with the request execution module 450 of FIG. 4 as described above.

Optionally, the step 610 above can lead to generating the inter-device communication to include the cooperative request for execution with the device smart agent of a further instance of the agent host device in a step 618 or to include a delegation transmission portion of the delegation request for transmission to the non-agent device in a step 620, as depicted by the dashed line and dashed box. The multifunctional platform system 100 can implement the device smart agent to generate the inter-device communication to include the cooperative request or the delegation transmission portion of the delegation request with the request execution module 450 of FIG. 4 as described above.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A platform management system, comprising:
an agent host device, including:
a controller to implement a device smart agent of the agent host device to:
receive a management request to maintain and/or manage at least one device, the management request being other than a request for the at least one device to perform a primary device function of the at least one device,
calculate a projected resource usage for the agent host device, the projected resource usage reflecting a consumption of power and/or memory for an anticipated execution of the management request,
determine a performance degradation of a primary device function of the agent host device based on the projected resource usage,
determine a request type of the management request and generate an inter-device communication based on the request type of the management request, when the performance degradation is less than a performance degradation threshold value, and
generate a platform management response to notify a platform management unit that execution of the management request will degrade performance of the primary device function of the agent host device, when the performance degradation is not less than the performance degradation threshold value; and
a communication unit, comprising at least one electronic component, coupled to the controller, to transmit the inter-device communication from the device smart agent for receipt by a non-agent device or an agent enabled device and to transmit the platform management response to the platform management unit.

2. The system as claimed in claim 1, wherein the controller is to implement the device smart agent to:
determine the request type of the management request as a cooperative request; and
generate the inter-device communication for executing the cooperative request with the device smart agent of another agent host device.

3. The system as claimed in claim 1, wherein the controller is to implement the device smart agent to:
determine the request type of the management request as a delegation request; and
generate the inter-device communication for transmission of a delegation transmission portion of the delegation request to the non-agent device.

4. The system as claimed in claim 1, wherein the controller is to implement the device smart agent to manage device plug-ins on the agent host device.

5. The system as claimed in claim 1, wherein the platform management response includes a request for further instructions from the platform management unit regarding the management request.

6. The system as claimed in claim 1, wherein:
the communication unit is to receive a device profile specific to the agent host device; and
the controller is to implement the device smart agent to install a device plug-in according to the device profile.

7. The system as claimed in claim 1, wherein the controller is to implement the device smart agent to retrieve state information from a device plug-in installed on the agent host device.

8. The system as claimed in claim 1, wherein the controller is to implement the device smart agent to provide a failover measure for a device plug-in installed on the agent host device.

9. The system as claimed in claim 1, wherein the communication unit is to transmit the inter-device communication for communication on a closed network.

10. The system as claimed in claim 1, wherein the platform management response includes a request for permission to take a different action from the platform management unit regarding the management request.

11. A method of operation of a multifunctional platform system, comprising:
receiving, by an agent host device, a management request to maintain and/or manage at least one device, the management request being other than a request for the at least one device to perform a primary device function of the at least one device;
calculating, with a controller of the agent host device, a projected resource usage for the agent host device, the projected resource usage reflecting a consumption of power and/or memory for an anticipated execution of the management request;

determining, with the controller, a performance degradation of a primary device function of the agent host device based on the projected resource usage;

determining a request type of the management request and generating an inter-device communication based on the request type of the management request, when the performance degradation is less than a performance degradation threshold value;

generating a platform management response to notify a platform management unit that execution of the management request will degrade performance of the primary device function of the agent host device, when the performance degradation is not less than the performance degradation threshold value; and transmitting the inter-device communication from a device smart agent of the agent host device for receipt by a non-agent device or an agent enabled device, or transmitting the platform management response to the platform management unit, based on whether the performance degradation is less than the performance degradation threshold value.

12. The method as claimed in claim 11, wherein:
determining the request type includes determining the request type as a cooperative request; and
generating the inter-device communication includes generating the inter-device communication to include the cooperative request for execution with the device smart agent of another agent host device.

13. The method as claimed in claim 11, wherein:
determining the request type includes determining the request type as a delegation request; and
generating the inter-device communication includes generating the inter-device communication to include a delegation transmission portion of the delegation request for transmission to the non-agent device.

14. The method as claimed in claim 11, further comprising managing device plug-ins on the agent host device.

15. The method as claimed in claim 11, wherein the platform management response includes a request for further instructions from the platform management unit regarding the management request.

16. A non-transitory computer readable medium including instructions executable by a processor of an agent host device, the instructions comprising:
receiving a management request to maintain and/or manage at least one device, the management request being other than a request for the at least one device to perform a primary device function of the at least one device;

calculating a projected resource usage for the agent host device, the projected resource usage reflecting a consumption of power and/or memory for an anticipated execution of the management request;

determining a performance degradation of a primary device function of the agent host device based on the projected resource usage;

determining a request type of the management request and generating an inter-device communication based on the request type of the management request when the performance degradation is less than a performance degradation threshold value;

generating a platform management response to notify a platform management unit that execution of the management request will degrade performance of the primary device function of the agent host device when the performance degradation is not less than a performance degradation threshold value; and transmitting the inter-device communication from a device smart agent of the agent host device for receipt by a non-agent device or an agent enabled device, or transmitting the platform management response to the platform management unit based on whether the performance degradation is less than the performance degradation threshold value.

17. The non-transitory computer readable medium as claimed in 16, wherein:
determining the request type includes determining the request type as a cooperative request; and
generating the inter-device communication includes generating the inter-device communication for executing the cooperative request with the device smart agent of another agent host device.

18. The non-transitory computer readable medium as claimed in 16, wherein:
determining the request type includes determining the request type as a delegation request; and
generating the inter-device communication includes generating the inter-device communication for transmission of a delegation transmission portion of the delegation request to the non-agent device.

19. The non-transitory computer readable medium as claimed in 16, further comprising managing device plug-ins on the agent host device when the management request includes the host device request.

20. The non-transitory computer readable medium as claimed in 16, wherein the platform management response includes a request for further instructions from the platform management unit regarding the management request.

* * * * *

UNITED STATES PATENT AND TRADEMARK OFFICE
CERTIFICATE OF CORRECTION

PATENT NO. : 10,250,460 B2
APPLICATION NO. : 14/823760
DATED : April 2, 2019
INVENTOR(S) : Ramon Rubio It is certified that error appears in the above-identified patent and that said Letters Patent is hereby corrected as shown below:

On the Title Page

In Column 2, item (56), foreign patent documents, Line 1, delete "20131006226" and insert -- 2013/006226 --, therefor.

In the Claims

In Column 30, Line 10 (approx.), Claim 16, delete "request" and insert -- request, --, therefor.

In Column 30, Line 22 (approx.), Claim 16, delete "unit" and insert -- unit, --, therefor In Column 30, Line 26 (approx.), Claim 17, delete "16," and insert -- claim 16, --, therefor.

In Column 30, Line 35 (approx.), Claim 18, delete "16," and insert -- claim 16, --, therefor.

In Column 30, Line 42 (approx.), Claim 19, delete "16," and insert -- claim 16, --, therefor.

In Column 30, Line 46 (approx.), Claim 20, delete "16," and insert -- claim 16, --, therefor.

Signed and Sealed this
Thirtieth Day of July, 2019

Andrei Iancu
*Director of the United States Patent and Trademark Office*